Figure 1:
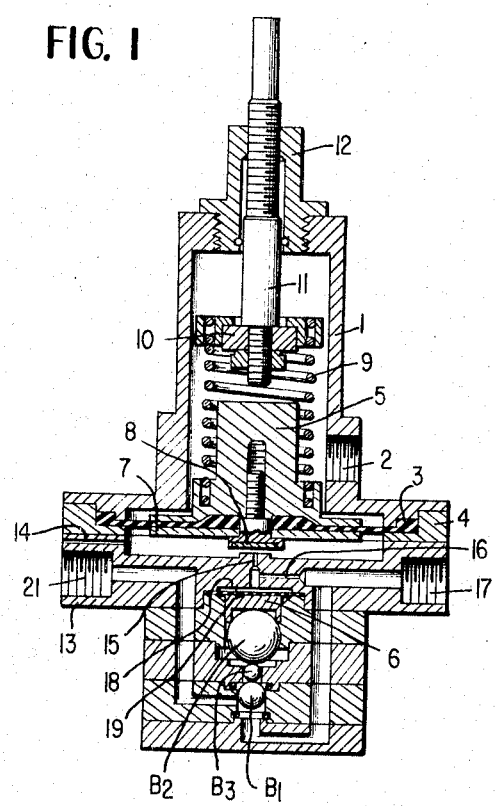

INVENTORS.
ANDRE SAINT-JOANIS
GEORGES LORIOT

FIG. 4
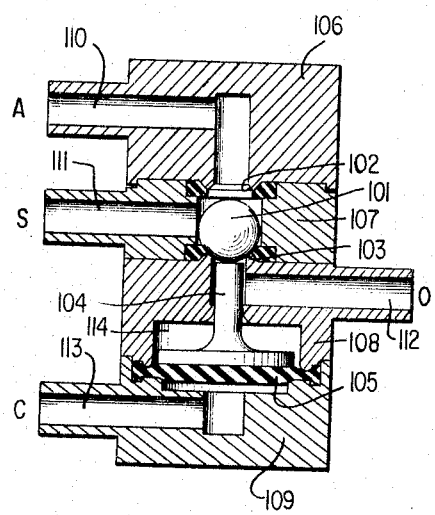
FIG. 5
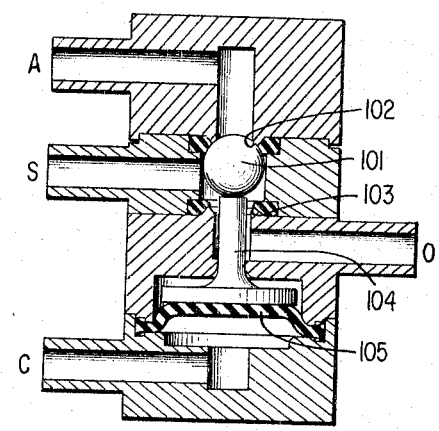
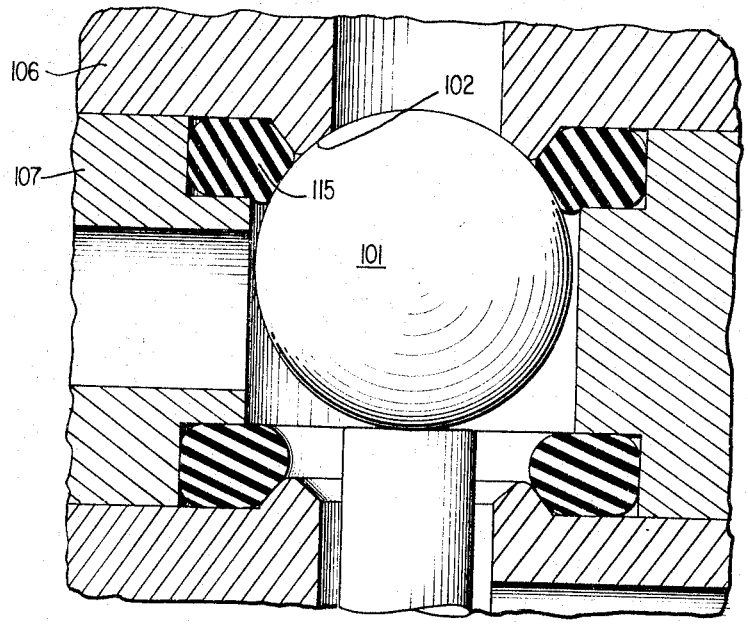
FIG. 6
INVENTORS.
ANDRE SAINT-JOANIS
GEORGES LORIOT
BY Paul M. Craig, Jr.
ATTORNEYS.

June 20, 1967  A. SAINT-JOANIS ET AL  3,326,239
FLUID DISTRIBUTOR DEVICES
Filed Dec. 23, 1963  5 Sheets-Sheet 3

INVENTORS.
ANDRE SAINT-JOANIS
GEORGES LORIOT

BY Paul M. Craig, Jr.
ATTORNEYS.

INVENTORS.
ANDRE SAINT-JOANIS
GEORGES LORIOT

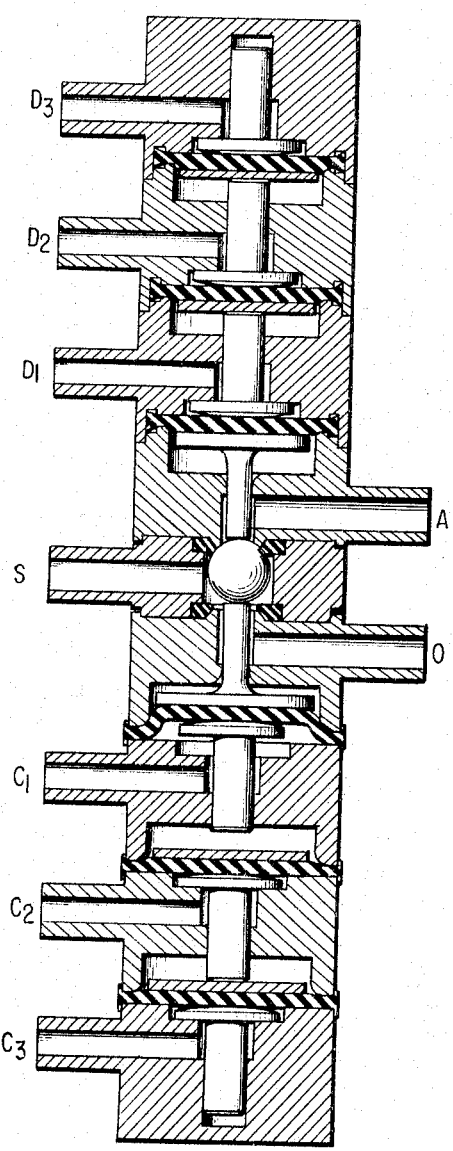
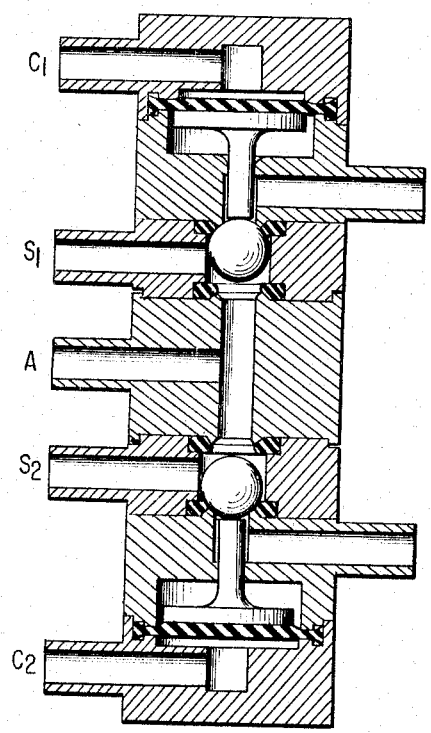

3,326,239
FLUID DISTRIBUTOR DEVICES
André Saint-Joanis, 47 Av. Vallioud, Sainte-Foy-les-Lyon, France, and Georges Loriot, 12 bis Rue David, Lyon, France
Filed Dec. 23, 1963, Ser. No. 332,364
Claims priority, application France, Dec. 21, 1962, 919,487; Oct. 28, 1963, 951,933; Dec. 7, 1963, 956,441
33 Claims. (Cl. 137—625.66)

The present invention relates to switching devices or flip-flop valve structures, particularly for use with pneumatically and/or hydrauilcally operated logical circuits, which have two stable conditions and are operable to produce one of two pressures in the outputs thereof in response to the fluid pressure in the inputs thereof.

Additionally, the present invention relates to fluid distributor devices having two stable positions, controlled by a fluid pressure, which permit to realize by themselves or by combinations thereof diverse logical functions between the signals at the inputs and output thereof.

Certain fluid switching or flip-flop devices using balance valves operate when the pressure at the input opening exceeds a certain level, which is determined once and for all by the dimensional characteristics thereof. However, in the application of these devices, a direct signal pressure of the required strength is not always available. Furthermore, the signal or triggering pressure may reach the triggering or switching value only in a slow and very progressive manner thereby, causing hesitations and possible delays in triggering action if the apparatus is not of relatively high sensitivity.

In order to remedy these shortcomings and to eliminate these disadvantages, a flip-flop or switching device having a variable response threshold is operatively interposed in the input circuit of the flip-flop or switching devices. This is a sensitive mechanism which switches or changes-over positively as soon as the pressure at the input thereof reaches the precise rated or preset value for which it is adjusted, and which then positively opens or closes the circuit it controls. The pressure at which switching or changing-over occurs is the rated or preset pressure. Irrespective of the shape of the input pressure wave as a function of time, that of the output pressure is always rectangular.

The sensitivity of the device is defined as the maximum difference permissible between the rated or preset threshold value and the value of the actual pressure which causes switching or flip-flop operation.

For this purpose, use has frequently been made of devices including a nozzle and closure member assembly operating by counter-reaction in which, once the operation is initiated, the displacement of the closure member or flap valve is self-sustaining and continues in the same direction until the nozzle is shut off completely.

The prior art devices of this type are not particularly rapid in operation nor particularly sensitive. They are not suitable to form rapid response miniaturized logical circuits.

The present invention relates to a switching or flip-flop device in the form of a balance valve with an adjustable response threshold or rated value and including a high performance nozzle and flap valve assembly.

The switching or flip-flop device of the present invention comprises a movable unit forming the sealed and deformable bottom of a chamber in which prevails the input pressure, and which is subjected on the other side to the opposed force of a spring having an adjustable spring force and bearing against the body of the device, the said unit comprising a closure member in the form of a flap valve cooperating with a fixed nozzle supplied with pressurized fluid through a restriction or jet which opens upstream of the nozzle into a pressure chamber, the deformable bottom of which actuates the two-position valve of the output circuit.

For a given sensitivity, a predetermined actuating area for the input pressure and a given nozzle and flap valve assembly, one selects a spring having such mechanical characteristics that the amplitude of its deformation in the unconstrained state is at least equal to the overall travel of the flap valve of the nozzle and flap valve assembly, when the pressure representing the input signal passes in either direction beyond the sensitivity range of the device on both sides of the rated or threshold level. The restriction or jet is selected in such a manner that it allows the passage of a flow of the same order only as that which can pass downstream through the fully opened nozzle.

The operation of the switching or flip-flop valve according to the present invention is then the following.

By adjusting the tension or compression of the spring, one presets the rated or threshold value to a level which depends on the pressure characteristics of the input circuit.

For as long as the force of the pressure within the input chamber applied to the movable unit does not reach the rated or threshold value, the spring does not move and the closure member or flap valve remains in the stationary position.

When the input pressure undergoes a variation such that the corresponding force, in one direction or in the other, exceeds the range or band of sensitivity on both sides of the rated value of the assembly effectively forming a detector and including the spring and the movable flap valve unit, the movable extremity of the spring is displaced and the flap valve travels the full length of its stroke, since the amplitude of its displacement is equal at most to that of the deformation of the spring.

The nozzle and flap valve assembly thus operates either wholly or not at all the instant at which the input pressure passes beyond a predetermined threshold and does so independently of the form of the variation of this pressure as a function of time.

This detector assembly, by virtue of the inertia and stroke of the nozzle and flap valve assembly which are very small, is very sensitive provided the spring has a stiffness matched to the device. It also has a very high speed of response.

If, for example, the flap valve shuts off completely the nozzle, the pressure in the lower chamber increases until it reaches the pressure prevailing in the nozzle supply circuit.

Owing to the construction upstream of the chamber, the variation in pressure is appreciable and sufficient in order that the closure member of the output circuit switches over from one position to the other, thus changing the output signal.

The response of the closure member or shutter becomes the more clearcut the greater the pressure variation in the chamber.

The speed of this response or reaction is also in direct proportion with the actuating surface of the pressure in the lower chamber. In fact, the force required for the switch-over or flip-flop of the closure member or shutter is then reached well in advance of the pressure attaining its maximum level.

We have described the operation of these devices when they are subjected to a variable input pressure, that is, they then switch over, within the limits of sensitivity, for a pressure equal to the datum or nominal value.

They are also employed in logical sequences, for which the input signal is a pressure which assumes only two extreme values.

A nominal or datum value is then selected, such that the range of sensitivity for switch-over in either direction lies wholly between the two signal pressures.

The advantage of the device then resides in the fact that it switches over positively and quickly even if the pressure wave of the input signal does not have a rectangular diagram as a function of time.

The embodiment of an apparatus acocrding to the present invention incorporates modifications of which some non-limiting examples will be described more fully hereinafter.

The nozzle supply circuit branches off as a rule from the output feed circuit. However, it is also within the scope of the present invention and in certain cases may be of interest to supply the nozzle in separate manner.

In certain types of devices, the displaceable assembly of the first chamber is constituted by a diaphragm or membrane member secured along its circumference to the body of the device.

In other constructions, it is a piston sliding in a sealed manner within a specially machined part of the body of the device.

In still further modified embodiments, it is an assembly of a diaphragm or membrane secured along the periphery of the pressure chamber and of a transmission lever for transmitting the pressure force.

It is also known in the prior art to utilize distributor devices constituted by a hollow body composed of cylinders of different dimensions which are disposed axially in series with one another, and within which are displaced balls of corresponding dimensions that are operable to transmit the movement imposed to one of the balls, certain of these balls being able to close or shut off in one or in the other of the two end positions thereof valve seats, placed between the various parts of the hollow body which are connected to fluid channels under pressure.

Such prior art devices, however, entail the inconvenience and disadvantage of necessitating precautions in order to enable the balls to move rapidly without harmful friction, and to involve only a slight leakage or escape of the control fluid during the transitory operation.

The present invention therefore relates also to an improved distributor device.

The distributor devices according to the present invention, in general, comprise:

A hollow body provided with at least 4 orifices, these orifices communicating in the order of their enumeration, the first so-called feed or supply orifice with a so-called feed or supply pressure source, the second so-called output orifice with a load or utilization network, the third orifice with a so-called reference pressure source, of a value inferior to the other pressures used in operation, the fourth and the following orifices, each with a so-called control pressure source, which may be located on both sides of the three first orifices;

Two valve seats located respectively between the first and the second orifice and between the second and the third orifice;

At least one elastic diaphragm or membrane member, the first diaphragm or membrane member being placed between the third and the fourth orifice, each of the other diaphragms or membrane members being placed between two orifices of rank higher than four, the said diaphragms or membrane members being deformed under the action of the resultant of the various pressure forces which are exerted on each of the same;

A movable shutter or closure member constituted preferably by one or several balls, susceptible to shut off or close alternately the two valve seats while assuring between the respective ball and the walls of the hollow body, a play permitting the free movement thereof and the passage of the fluid. Depending on the particular case, the shutter or closure structure may comprise one element, for example, a ball movable between the two valve seats, or two elements, for example, two balls situated on both sides of the two valve seats and of which the movements are tied or linked by transmission elements;

Movable elements between the movable closure member and the first diaphragm or membrane member as well as between successive membranes and transmitting up to the closure member the movement impressed on each diaphragm or membrane member.

The present invention also encompasses the devices resulting from a combination of structures thus defined, for example, the combinations in which several diaphragms or membrane members are disposed on both sides of the same shutter or closure member, in which two devices are assembled within the same body with a common feed or supply, or in which one and the same diaphragm or membrane member is actuated by several control signals.

The additional advantages of the present invention are as follows:

The commutation by the means of the ball-type shutter or closure member permits a safe functioning, with an easy, sturdy and rugged realization. In effect, the fluid-tightness between the output and supply orifices or the orifice connected with the reference pressure, assured by the abutment of the shutter or closure member against a valve seat, is realized perfectly without any problems as regards machining or play;

There exists an isolation of supply and control fluids by the diaphragms or membrane members. Consequently, there is no danger of mixing between the supply fluid and that or those of the control fluids, or between the various eventual control fluids;

No problem whatsoever exists and, therefore, no problem of manufacturing control of the movable control elements since they only play a transmission role, the fluid-tightness being assured by the diaphragm or membrane member;

Neither pressure drops nor leakage from the side of the control during the duration of the change-over or flp-flop operation can occur in the devices according to the present invention.

The miniaturization of these devices is both easy and simple. It is current practice to realize simple devices of 40 mm. in length and of 20 x 20 mm. of square cross section. The encumberances of the circuits is, therefore, considerably reduced. Moreover, the movable assembly of each device has a very slight inertia which permits a rapid response.

The hollow body may be obtained by assembly of elements with or without insertion of seals between the different parts thereof. These elements may be obtained either by molding and/or by machining.

The movable closure member is preferably of hard material and may have any form assuring a tightness upon its alternate abutment on each of the valve seats.

The apparatus according to the present invention comprise a play between the movable closure member and the hollow body in such a manner as not to impair the movement of the closure member and the flow of the fluid either between the supply and the output or between the output and the reference network. The most commonly utilized plays are comprised between 0.2 and 2 mm. it being understood, however, that these dimensions are not to be considered limitative of the present invention.

As will appear more fully hereinafter, in the devices according to the present invention, the movement of the closure member is assured exclusively by the variations of pressure at the supply and input orifices.

The structures according to the present invention make it possible to constitute by themselves or by combinations thereof logical functions and logical circuits dependent exclusively on pressure fluids.

Accordingly, it is an object of the present invention to provide a fluid operated switching device of the type described hereinabove which obviates the shortcomings and drawbacks encountered with the prior art devices.

Another object of the present invention resides in the provision of a positively acting flip-flop valve structure which precludes delays, hesitations and vascillations in the triggering action irrespective of the form of the control signal at the input thereof.

Another object of the present invention resides in the provision of a fluid operated switching device which exhibits a high sensitivity as well as rapid response all of which are realized by extremely simple means that may be readily assembled and disassembled.

A further object of the present invention resides in the provision of a switching valve structure which not only permits a simple adjustment of the rated or trigger level at which change-over occurs, but which is also relatively simple in construction and inexpensive to manufacture.

A still further object of the present invention resides in the provision of a switching device, particularly for fluid-operated logical circuits which has a very high speed of response with excellent sensitivity yet prevents leakage losses especially during change-over operating periods.

Still a further object of the present invention resides in the provision of a switching valve structure in which positive-action switching is reached well in advance of the maximum attainable pressure level of the fluid.

It is another object of the present invention to provide a fluid distributor device, particularly for use with logical circuits which assures a reliable operation by simple means.

A further object of the present invention resides in the provision of a distributor device for use with fluids which utilizes a movable closure member to produce a bi-stable commutation, yet is relatively inexpensive in structure, easy to manufacture and assemble, and sturdy in its construction.

Another object of the present invention resides in the provision of a fluid distributor device, particularly suited for logical circuitry application, which assures a perfect fluid-tightness between the orifices connected to the output and the supply pressure source or the reference pressure source.

Another object of the present invention resides in the provision of a distributor device, particularly of the type providing two stable conditions for use in logical circuits, in which the fluid-tightness between the various inputs and outputs may be realized in a simple manner without difficulties in machining or in obtaining the necessary play of the movable parts.

Still a further object of the present invention resides in the provision of a logical circuit distributor device for fluid media which eliminates any danger of intermixing of the various fluids used in the system.

Still another object of the present invention resides in the provision of a fluid distributor device of the type described above in which the manufacture of the movable parts is greatly facilitated by relieving the same of any sealing function during the switching or flip-flop operation of the valve from one of its two stable conditions to the other.

A further object of the present invention resides in the provision of a fluid distributor device of the type described hereinabove which may not only be readily adapted for miniaturization, but also eliminates pressure drops and fluid leakages particularly in the control parts thereof, especially during the change-over operation from one to the other of the two stable conditions.

Still a further object of the present invention resides in the provision of a fluid distributor device in which the fluid tightness is assured by one or several diaphragms or membrane members and in which amplification may be readily obtained by appropriate dimensions of the various elements.

Figure 2:
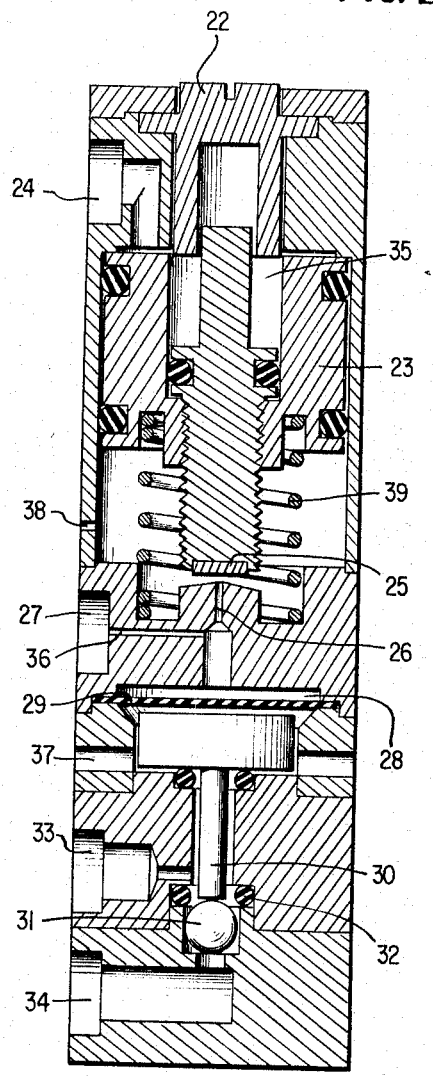
Figure 3:
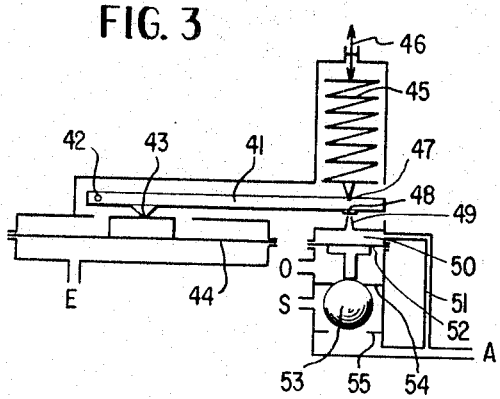
Figure 7:
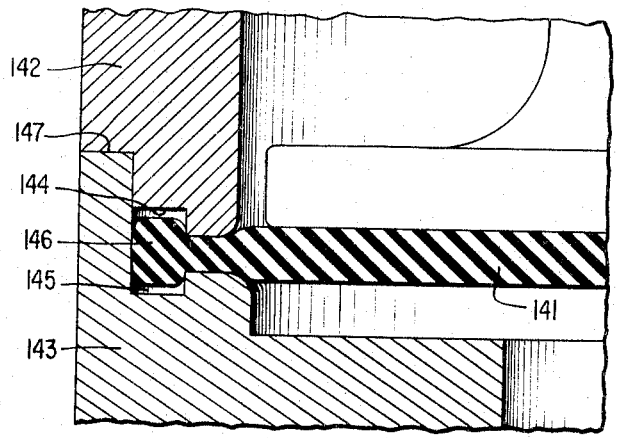
Figure 8:
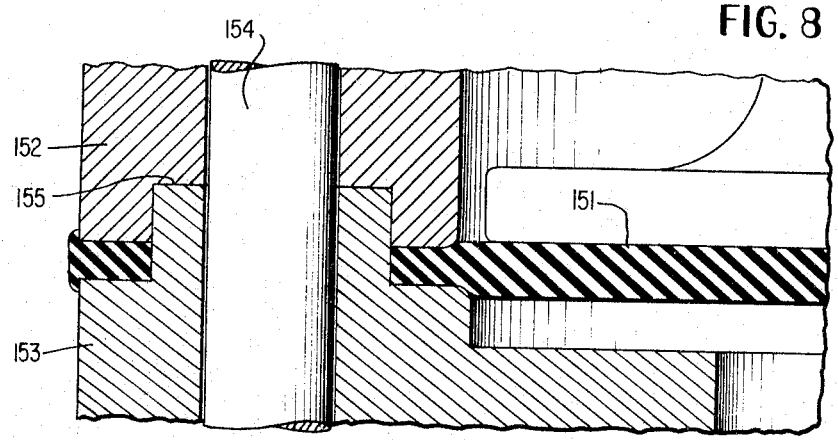
Figure 9:
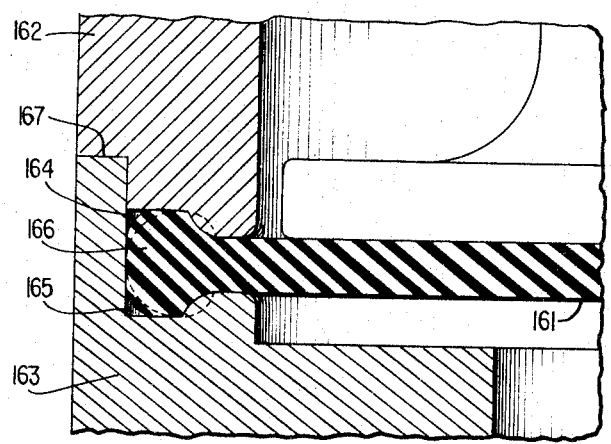

These and other objects, features and advantages of the present invention will become more obvious from the following description, when taken in connection with the accompanying drawing which shows, for purposes of illustratio only, several embodiments in accordance with the present invention, and wherein FIGURE 1 is an axial longitudinal cross sectional view through a first embodiment of a negative-action, variable datum switching valve structure in accordance with the present invention, utilizing a tension spring, FIGURE 2 is an axial longitudinal cross sectional view, similar to FIGURE 1, through a modified embodiment of a switching valve structure in accordance with the present invention, and utilizing a compression spring, FIGURE 3 is a schematic cross sectional view through a third embodiment of a switching valve structure in accordance with the present invention, utilizing a lever arrangement for the application of the various forces, FIGURE 4 is a cross sectional view through a distributor device in accordance with the present invention illustrating the parts thereof in one of the two stable positions, FIGURE 5 is a cross sectional view, similar to FIGURE 4, and illustrating the various parts thereof in the other of the two stable positions thereof, FIGURE 6 is a partial cross sectional view, on an enlarged scale, through the distributor device of FIGURES 4 and 5, and illustrating certain details of the abutment of the movable closure member against the valve seat thereof;

FIGURES 7, 8 and 9 are partial cross sectional view, also on an enlarged scale, through three different modified embodiments, illustrating three different types of securing arrangements for the diaphragms or membrane members in accordance with the present invention, and FIGURES 10, 11, 12, 13 and 14 are cross sectional view, similar to FIGURES 4 and 5, through five different distributor devices in accordance with the present invention, and utilizing different combinations of the basic arrangement shown in FIGURES 4 and 5.

Referring to the drawing, and more particularly to FIGURE 1, the outer body 1 of the device in accordance with the present invention of this figure receives the input signal pressure at orifice or port 2 and the supply or feed pressure at orifice or port 17. The output is taken at orifice or port 21.

A fluid tight diaphragm or membrane member 3 gripped along its periphery between a part machined into the body 1 and a part machined into the annual component 4 thereof, is at all times subjected to the input pressure prevailing at 2. Coaxial to this diaphragm 3 and fastened to the same is mounted a movable unit or displaceable assembly which comprises a cylindrical member 5, a backing plate 7 and an adjustable closure member or flap 8 suitably supported thereon. A tension spring 9 is tensioned between the movable unit 5 and a ring 10, the position of which is adjusted by rotation of the screw-threaded adjusting rod 11, which is screwed into the cap 12. This renders it possible to adjust the tension of the spring 9. The spring 9 may be fastened in any suitable conventional manner to cylindrical member 5 and to ring 10.

The nozzle 15 disposed beneath and facing the closure member or flap valve 8 receives the supply of compressed feed air 17 through the constricted passage 16 and discharges it through the narrow outlet passage 14 after passing through the chamber disposed directly below the diaphragm 3.

The constricted passage 16 also conveys the supply of compressed feed air to the space above the diaphragm 19 which forms the deformable bottom of the second chamber 18 and which by means of the piston 6, controls and operates the valve provided with three balls $B_1$, $B_2$, $B_3$ which selectively establishes a communication between the supply port 17 and the output port 21.

As long as the variable input pressure at port or orifice 2 is lower than the preset or threshold value, determined by the loading of the spring, the closure member or flap valve 8 held by the tension spring 9 remains unmoved in the position illustrated in the figure, whereby the nozzle 15 is wide open, the ball valve is open, and the air supplied at port 17 leaves at port 21 at its maximum pressure.

At the precise instant at which the input pressure at 2 exceeds the rated value, the tension of the spring 9 can no longer counteract the downward force of the pressure of the compressed feed air on the diaphragm 3 which becomes deformed, whereupon the movable unit 5, 7, 8 is displaced very slight and this is sufficient for the closure member or flap valve 8 to shut off the nozzle 15 instantaneously and completely. Shut off of nozzle 15 results in actuating a switching means comprised by a lower system including elements 6, $B_2$, $B_3$, and $B_1$. The judicious and appropriate dimensioning of the lower movable system 6, $B_2$, $B_3$, $B_1$ has the effect that the increase in pressure within the chamber 18 above the diaphragm 19 causes the instantaneous downward displacement of the piston 6 and of the balls $B_2$, $B_3$ and $B_1$. The pressure at the output 21 thus becomes a minimum as the communication thereof with the port 17 is interrupted by the ball valve.

At the precise instant at which the input pressure at 2 drops again below the rated value, means comprised by tension spring 9 automatically returns the switching means comprised by the movable unit 6, $B_2$, $B_3$ and $B_1$ to its initial position, and as a result thereof, the nozzle 15 opens completely and the system switches over in the other direction.

The switching device or flip-flop valve having an adjustable response threshold or rated value according to the present invention thus makes it possible to operate a switching valve or flip-flop device which is sensitive to sudden and substantial pressure fluctuations, but which would fail to detect the weak or slow variations of the input signal pressure at 2 which operates the switching device or flip-flop valve.

A second embodiment of a switching device according to the present invention is illustrated in FIGURE 2.

This positive action switching device or flip-flop valve comprises a body divided into three parts by the piston 23 and the deformable diaphragm or membrane 29. The input pressure prevails in this embodiment within the upper chamber 35 supplied through orifice or port 24.

The median space is connected, on the one hand, through port or orifice 27 to the supply circuit through the nozzle 26 and the narrow passage 36 which open into the chamber 28, and on the other, to a discharge opening 38.

The lower space is connected to the inlet 34 and to the outlet 33 of the output circuit, and to a discharge opening 37.

The spring 39 operating in compression and loaded by means of the screw 22 bears with the lower end thereof against the body of the device and with the upper end thereof against the piston 23 which slides in a sealed manner along the inner wall of the body, and which carries the closure member or flap valve 25 in the form of a disk-like member or the like.

When the pressure within the upper chamber 35 increases beyond the preset value, the closure member or flap valve 25 shuts off or closes the nozzle 26 which causes the pressure in the chamber 28 to increase. The diaphragm 29 is deformed and pushes or displaces the piston 30 downwardly which, in turn, lifts the valving means comprised by the ball 31 off its seat 32. The pressure at 34 is then freely transmitted to the output 33.

Conversely, when the pressure in the upper chamber 35 drops below the rated or preset value, the closure member or flap valve 25 opens the nozzle 26, the pressure drops in the second chamber 28 and the pressure prevailing at orifice or port 34 applies the ball 31 against its seat 32, thus placing the output circuit 33 in communication with the atmosphere through orifice or port 37.

A third embodiment of a valve structure according to the present invention is schematically illustrated in FIGURE 3. In this embodiment, the closure member or flap valve secured on the one hand, to the extremity of the calibrating spring, is connected, on the other, to a point of a lever to another point of which is applied the input pressure.

The lever 41 of FIGURE 3 is movable about the axis or pivot pin 42 in any suitable manner. The lever 41 is subjected to the force which is exerted by the input pressure prevailing at the input port or orifice E on the piston-like actuating surface 44. On the extremity 47 thereof located at the other end from the axis or pivot pin 42, the lever 41 is subjected to the force of the spring 45 which is adjustable by means of a conventional device 46, for example, of the screw type. This spring force is opposed to that of the input pressure. This same extremity carries the closure member or flap valve 48 again in the form of a flat disk-like member or the like and cooperating with the nozzle 49; this nozzle 49 constitutes the discharge outlet of the chamber 50 provided with a deformable bottom 52, fed with compressed supply fluid through the constricted passage 51 which allows the passage of a flow only of the same order of magnitude as is able to pass downstream through the fully opened nozzle 49. This deformable bottom 52 acts on the valving means comprised by the ball 53 which alternately closes the two valve seats 54 and 55.

The orifice or port A is the supply aperture of the device for the pressurized fluid, while the orifice or port S is the output orifice of the device and port or orifice O is the orifice for connection to the reference or datum pressure.

The area of the deformable bottom 52 of the chamber 50 is greater than the main section of the ball 53 in the case in which the maximum pressure within the chamber 50 does not exceed the supply pressure.

*Operation*

The operation of the switching device or flip-flop valve of FIGURE 3 is the following:

When the pressure at the input orifice E is higher than the rated or preset value, the lever 41 compresses the spring 45. The nozzle 49 is opened. The pressure within the chamber 50 is sufficiently low for the supply pressure prevailing at port or orifice A to repel the ball 53 against the seat 54 and therewith to establish the supply pressure at the output port or orifice S as shown with the parts of FIGURE 3 in the illustrated position thereof.

When the input pressure at E drops below the rated or preset value, the spring 45 repels the lever 41 and the closure member or flap valve 48 shuts off the nozzle 49 completely. The pressure within the chamber 50 increases sufficiently for the deformable bottom 52 to repel the ball 53 against the seat 55, thereby placing the output S into communication with the datum pressure O.

The ball valve 53 may also be so constructed and arranged so as to establish again a communication between ports S and A when the pressure at E is lower than the rated pressure, and to establish the communication between ports S and O in the other case.

A switching device or flip-flop valve of this kind may be converted into a differential switching valve adapted to compare the intensities of two input pressures.

In that case, the more powerful of these two pressures, $p_1$, will be applied like the input pressure of the embodiment of FIGURE 3. The weaker pressure, $p_2$, will act on the lever in a direction opposed to that of the force $p_1$, that is, its action will be added to that of the spring.

If the two points of application of the forces exerted by the action of the pressures $p_1$ and $p_2$ on the lever are at the same distance from the pivot axis, and if the actuating surfaces for the pressures are equal, the apparatus will switch at the instant at which the value of the pressure difference $(p_1-p_2)$ exceeds a given threshold, within the range of sensitivity of the device.

If these conditions are not realized, the device switches when the value of a linear function of $p_1$ and $p_2$, having the form $(ap_1-bp_2)$, exceeds a predetermined threshold.

As in the general case, the threshold may be regulated by selection of the initial stiffness and compression of the spring.

Again, it may also be advantageous to have a nozzle supply circuit independent of the supply circuit feeding the output.

In the embodiment of FIGURES 4 and 5, the fluid distributor device illustrated in its simplest form according to the present invention in longitudinal cross section and in each of the two stable positions thereof, is essentially constituted of the following parts;

Of a hollow body with 4 orifices; the first orifice A is connected with a source of supply fluid, the second orifice S constituting the output orifice is connected to the utilization or load circuit, the third orifice O is in communication with the atmosphere or connected to a source of reference pressure lower than the other pressures utilized during operation, and the fourth orifice C is connected to a so-called control pressure source;

Of two valve seats 102 and 103 located respectively between orifices A and S and orifices S and O;

Of a movable shutter or valving means 101, preferably a ball, having a certain play with respect to the internal walls of the hollow body, and susceptible to the alternately applied against the two valve seats 102 and 103 due to the pressure of the control fluid exceeding a predetermined level, or due to gravity upon the pressure of the control fluid dropping below the predetermined level;

Of a fluid-tight diaphragm or membrane member 105 placed between orifices O and C, deformable under the action of the resultant of the pressure forces at he various orifices; and Of a transmission assembly 104 transmitting the movement between the diaphragm or membrane member 105 and the closure member 101.

*Operation*

The operation of the device of FIGURES 4 and 5 is as follows:

In the absence of supply pressure, no output pressure is possible irrespective of the control pressure.

In the position illustrated in FIGURE 4, there exists a supply pressure at orifice A. In the absence of a control pressure at the orifice C, the ball 101 is repelled or pushed back against the seat 103. The transmission member 104 and the diaphragm 105 are in the rest position thereof. The communication is established across the open valve seat 102 between the orifices A and S. Hence, an output signal exists at the output orifice S.

In the position of FIGURE 5, the orifice A is connected to a supply pressure source, the orifice C is connected to a source of sufficiently strong control pressure, taking into proper consideration the respective load or actuating surfaces for the pressures on the movable parts, in order to push back or repel the diaphragm 105, the transmission member 104 and the ball 101, whereby the latter abuts against the valve seat 102 and closes the same. The communication is then interrupted between orifices A and S, but is established between orifices S and O across the open valve seat 103. Hence, no more output signal exists in the orifice S.

If one designates by $a$, $c$, $s$ the signals distributed to the respective orifices A, C, S, the apparatus may realize the logical operation, represented in Boole notation, by the equation:

$$s = a \times \bar{c}$$

where s is the output signal level (generally in the form of a pressure head) appearing at the output orifice S, and $a$ and $c$ are the input signal levels appearing at the input orifices A and C, respectively.

The return takes place only by the interplay of the pressure at the various orifices or eventually by a spring, for example, as shown in the embodiments of FIGURES 1 to 3. The device described may play the role of amplifier with a judicious and appropriate choice of the actuating surfaces for the fluid pressures.

The gain is then defined as to a ratio between the supply pressure at orifice A and the minimum pressure of the signal at orifice C necessary to obtain a positive change-over or flip-flop operation. On the side of the control, no leakage takes place during the transitory operation and the control fluid loss is zero. Furthermore, no control pressure drop occurs at the moment of commutation or switching which is very important if one operates with a fluid having a very high pressure supplied by a pump. Moreover, any passage of the control fluid through another orifice of the device is excluded.

From the point of view of practical relization, the body of the apparatus illustrated in FIGURES 4 and 5 is constituted of the four elements 106, 107, 108 and 109, provided with conduits or channels 110, 111, 112 and 113 connecting the interior of the hollow body to the respective orifices A, S, O, and C. The assembly of these elements 106, 107, 108 and 109 may be realized, for example, by bolting, bonding, binding or riveting.

A recess or space 114 may be provided in such a manner that the control pressure is exerted on the largest possible surface. The head portion of the transmission plunger member 104 in contact with the diaphragm or membrane member 105 must also be as large as possible in order that the diaphragm 105 cannot be deformed along the periphery of the plunger 104.

FIGURE 6 represents an enlarged cross-sectional view of a detail of FIGURE 5 in the case in which the ball 101 is placed against the upper seat 102 forming part of the body of the device and constituted by element 106 thereof. The ball 101 slightly deforms the flexible ring 115 gripped or held tight between the elements 106 and 107, thereby realizing the fluid-tight closing of the seat 102. The deformation is obviously limited, which avoids the crushing of the flexible sealing ring 115 and the risk that the ball 101 may become stuck to the seal 115. On the other hand, the course or path of the ball 101 is thus exactly determined by the spacing of the rigid seats 102 and 103. The length of the stem portion of the plunger 104 must assure as a minimum this path to the ball 101. It suffices for that purpose, as one may readily see from FIGURES 4 and 5, that, when the ball 101 is applied against the seat 102, there subsists a slight play between the head portion of the plunger 104 and the bottom of the element 108.

The manner of securing the diaphragm or membrane 105 must not alter the flat or plane configuration of the central portion thereof. As non-limitation examples, FIGURES 7, 8, and 9 illustrate three modes of securing the diaphragm 105 in accordance with the present invention.

In FIGURE 7, the diaphragm or membrane 141 is a simple elastic disk squeezed between the elements 142 and 143 of the body of the device which are provided with annular cavities or recesses 144 and 145 in which the volume of the material displaced during tightening is accommodated, thus forming a peripheral bead or rim 146 assuring an effective anchoring. The heel portions of the elements 142 and 143 are of slightly conical shape to favor the displacement of the material in the direction of the cavities or recesses 144 and 145.

FIGURE 8 illustrates a partial cross-sectional view taken along a diagonal of the elements 152 and 153 of square cross section. The diaphragm or membrane 151 itself is also of square shape. The diaphragm 151 may be tightened or gripped over an important surface, and at the same time may be hooked about four assembly bolts 154. A slight square rim is formed in this embodiment during the tightening along the periphery of the diaphragm 151.

In FIGURE 9, the diaphragm or membrance 161 that is used is a molded disk. The diaphragm 161 comprises a peripheral cord 166 in the form of a tore which assures the anchoring within the cavities or recesses 164 and 165 of the elements 162 and 163. The heel portions of the elements 162 and 163 do not crush the diaphragm 161, but displace or push back a certain volume of the material toward the outside which slightly stretches or tightens the central portion of the diaphragm 161.

In the three last-mentioned figures; that is, in FIGURES 7, 8, and 9, circular embossments 147, 155, and 167 of the elements 143, 153, and 163, respectively, abut against the bottom of corresponding apertures or recesses provided in the elements 142, 152, and 162 to limit the tightening of the diaphragm or membrane member and therewith to prevent damage to the latter.

The combination of several of the devices of the type of FIGURE 4 and FIGURE 5 enables the realization of numerous logical functions or logical circuits.

One may thus realize more complex devices corresponding to various logical functions or to the particular connection exigencies or requirements.

Figure 10:
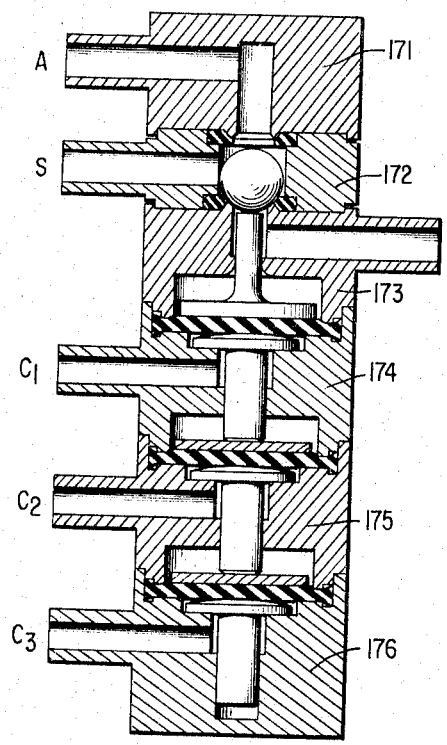

FIGURE 10 represents a device realizing the logical function "NOR" with three inputs $C_1$, $C_2$, and $C_3$. The elements 171, 172, 173, and 176 of the hollow body are, respectively, identical to the elements 106, 107, 108 and 109 of the device of FIGURES 4 and 5. Additionally, two elements 174 and 175 have been interposed which are provided with control orifices $C_2$ and $C_3$ and necessary diaphragms or membrane members, between the element 173 and the element 176 provided with the control orifice $C_3$.

A communication between orifice A and S exists only if none of the control orifices $C_1$, $C_2$, or $C_3$ are under pressure.

Hence, an output signal exists provided the supply is under pressure. This may be expressed, in Boolean notation, by the equation:

$$s = a \times \bar{c}_1 \times \bar{c}_2 \times \bar{c}_3$$

where $c_1$, $c_2$, and $c_3$ are input signal pressures at control orifices $C_1$, $C_2$ and $C_3$, respectively, $s$ is the output signal pressure, and $a$ is the input or supply pressure.

Figure 11:
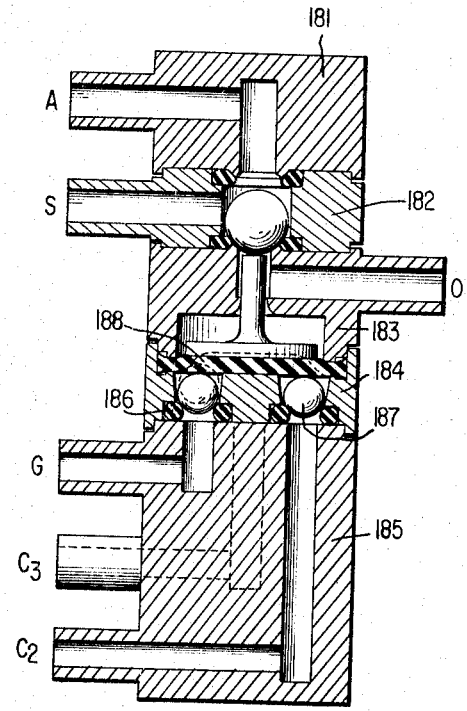

FIGURE 11 illustrates a modified embodiment of the FIGURE 10. The three elements 181, 182 and 183 correspond to the elements 171, 172 and 173 of FIGURE 10. The three control orifices $C_1$, $C_2$ and $C_3$ are provided in a single element 185. Control orifices $C_1$ and $C_2$ are, for example, in the plane of the drawing, whereas control orifice $C_3$ is to the rear in this plane of the cross section. The three inputs are rendered independent of one another by the operative association of one ball-type check valve for each control orifice, such as check valves 186 and 187 within an intermediate element 184. The piloting or control role is assured by the single diaphragm or membrane member 188 which is actuated by one or several of the control pressures at orifices $C_1$, $C_2$, and $C_3$. When none of the control orifices $C_1$, $C_2$ and $C_3$ is under pressure, the diaphragm 188 maintains the balls 186 and 187 of the check valves against the valve seats thereof. When a control signal appears, the corresponding ball rises within its space, flared in such a manner as to facilitate the passage of fluid which then raises the diaphragm 188 up to the position illustrated in FIGURE 11 in dash lines. The balls of the other check valves are applied against the valve seats thereof by the control pressure.

Figure 12:
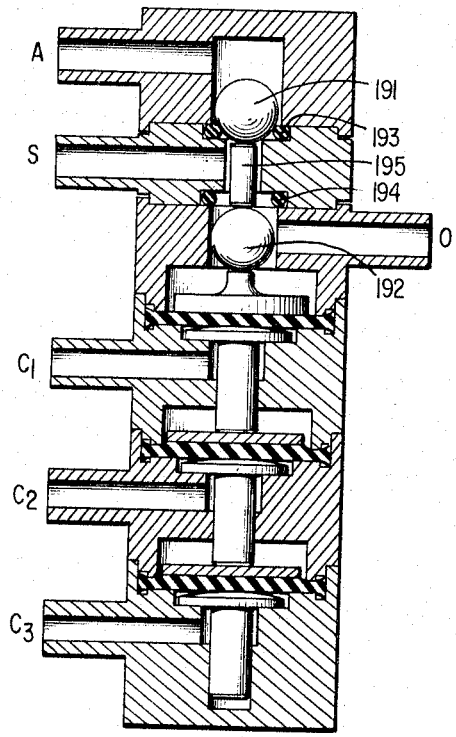

FIGURE 12 illustrates a device realizing the logical function "OR" with three inputs $C_1$, $C_2$ and $C_3$. The control stage of this embodiment is constituted as in FIGURE 10. The shutter or closure member is formed in this embodiment of two external balls 191 and 192, disposed at the distance of the valve seats 193 and 194, which they can never close at the same time. A transmission member 195 for transmitting the movement from one to the other ball is placed between the balls 191 and 192. Hence, a communication between the supply orifice A and the output orifice S and therewith a signal at orifice S exists, if the supply is under pressure, from the moment when at least one of the control orifices $C_1$, $C_2$, or $C_3$ is under pressure. This may be expressed by the following equation:

$$s = a(C_1 + C_2 + C_3)$$

where $s$ is the output signal pressure, $a$ is the input or supply pressure, and $C_1$, $C_2$ and $C_3$ are the control pressures, respectively.

FIGURE 13 represents a condensed assembly of two simple distributor devices having a common supply A in the position thereof in which a signal exists at the two outputs $S_1$ and $S_2$ in the absence of a signal at the control orifices $C_1$ and $C_2$. By supplying pressure to the orifice $C_1$ and/or $C_2$, the output signal at $S_1$ and/or $S_2$, respectively, are suppressed.

FIGURE 14 represents a distributor device with dual pilot or control. There exists a single commutation or switching ball. Two series of elements with control orifices $C_1$, $C_2$, $C_3$ and $D_1$, $D_2$, $D_3$ are disposed on both sides of the elements comprising the supply orifice A and reference pressure orifice O. The control pressures and the actuating surfaces of the diaphragms or membrane members of the two series are such that the controls $C_1$, $C_2$, and $C_3$ predominate.

Of course, numerous other devices or combinations thereof are susceptible within the spirit and scope of the present invention. Furthermore, technological modifications may also be made to the devices described herein without departing from the spirit and scope of the present invention.

Thus, while we have shown and described several embodiments in accordance with the present invention, it is understood that the same is not limited thereto, but is susceptible of many changes and modifications within the spirit and scope thereof as known to a person skilled in the art, and we therefore do not wish to be limited to the details shown and described herein, but intend to cover all such changes and modifications as are encompassed by the scope of the appended claims.

We claim:
1. A control device enabling the control of a fluid circuit when the pressure of a control circuit passes through a predetermined value, comprising:
 a valve body,
 fluid tight diaphragm means secured within said body in such a manner as to be exposed to the control fluid pressure of a first fluid circuit,
 nozzle means within said body and forming the discharge aperture for a second fluid circuit,
 closure means within said valve body and operable to either close or open said nozzle means,
 means operatively connecting said closure means with said diaphragm means for opening and closing said closure means in response to movement of said diaphragm means,
 spring means within said valve body and exerting a spring force on said closure means, a third fluid circuit, said diaphragm means serving to effectively isolate said first fluid circuit from said second and third fluid circuits,
 and switching means operable in response to opening and closing of said closure means to valve said third fluid circuit to produce one of two pressure values in the valve output,
 said second fluid circuit being operable through said nozzles means and said closure means to cause change-over of said switching means.

2. A control device enabling the control of a fluid circuit when the pressure of a control circuit passes through a predetermined value, comprising:
 a valve body,
 fluid tight diaphragm means secured within said body in such a manner as to be exposed to the control fluid pressure of a first fluid circuit, nozzle means within said body and forming the discharge aperture for a second fluid circuit, closure means within said valve body and operable to either close or open said nozzle means, means operatively connecting said closure means with said diaphragm means for opening and closing said closure means in response to movement of said diaphragm means, spring means within said valve body and exerting a spring force on said closure means, said spring means being adjustable to enable adjustment of the valve of the switching pressure, a third fluid circuit, said diaphragm means serving to effectively isolate said first fluid circuit from said second and third fluid circuits, switching means operable in response to opening and closing of said closure means to valve said third fluid circuit to produce one of two pressures values in the valve output, said second fluid circuit being operable through said nozzle means and said closure means to cause changeover of said switching means, a chamber provided within said valve body of which said nozzle means is the discharge orifice, the pressure in said chamber being controlled by said nozzle means and said closure means and controlling operation of the switching means, and means for supplying said chamber with fluid from the second fluid circuit.

3. A control device enabling the control of a fluid circuit when the pressure of a control circuit passes through a predetermined value, comprising:

a valve body, fluid tight diaphragm means secured within said body in such a manner as to be exposed to the control fluid pressure of a first fluid circuit, nozzle means within said body and forming the discharge aperture for a second fluid circuit, the output from said nozzle means when open being vented to the atmosphere, closure means within said valve body and operable to either close or open said nozzle means, means operatively connecting said closure means with said diaphragm means for opening and closing said closure means in response to movement of said diaphragm means, a third fluid circuit, said diaphragm means serving to effectively isolate said first fluid circuit from said second and third fluid circuits, switching means operable in response to opening and closing of said closure means to valve said third fluid circuit to produce one of two pressure values in the valve output, said second fluid circuit being operable through said nozzle means and said closure means to cause changeover of said switching means, a chamber provided within said valve body of which said nozzle means is the discharge orifice, the pressure in said chamber being controlled by said nozzle means and said closure means and controlling operation of the switching means.

and means forming a constricted passage for supplying said chamber with fluid from the second fluid circuit, the fluid resistance of said restricted passage being of about the same order of magnitude as that of the fully opened nozzle means.

4. A control device enabling the control of a fluid circuit when the pressure of a control circuit passes through a predetermined value, comprising:

a valve body, fluid tight diaphragm means secured within said body in such a manner as to be exposed to the control fluid pressure of a first fluid circuit, nozzle means within said body and forming the discharge aperture for a second fluid circuit, the output from said nozzle means when open being vented to the atmosphere, closure means within said valve body and operable to either close or open said nozzle means, means operatively connecting said closure means with said diaphrgam means for opening and closing said closure means in response to movement of said diaphragm means, spring means within said valve body and exerting a spring force on said closure means, said spring means being adjustable to enable adjustment of the value of the switching pressure, a third fluid circuit, said diaphragm means serving to effectively isolate said first fluid circuit from said second and third fluid circuits, on-off, switching means operable in response to opening and closing of said closure means to valve said third fluid circuit to produce one or two pressure values in the valve output, said second fluid circuit being operable through said nozzle means and said closure means to cause changeover of said on-off switching means, said on-off switching means being either fully on or fully off in response to the control fluid pressure exceeding a predetermined value, a chamber provided within said valve body of which said nozzle means is the discharge orifice, the pressure in said chamber being controlled by said nozzle means and said closure means and controlling operation of said switching means, and means forming a constricted passage for supplying said chamber with fluid from the second fluid circuit, the fluid resistance of said restricted passage being of about the same order of magnitude as that of the fully opened nozzle means.

5. A fluid distributor having two stable positions, comprising:

hollow body means, said hollow body means being provided with chamber means and a plurality of orifice means in communication with said chamber means and including at least first orifice means forming a supply orifice, second orifice means forming an output orifice, and third orifice means forming a single ended control orifice, valve seating means formed within said hollow body means and valving means adapted to engage with said seating means and having two end positions, fluid tight elastic membrane means secured within said hollow body means at a place disposed between said third orifice means and at least one of the first and second orifice means, and acted on by fluid pressure from said third orifice means, said elastic membrane means serving to effectively isolate said third orifice means from said first and second orifice means, connecting means operatively connecting said elastic membrane means with said valving means to actuate said valving means in response to the pressure at said control orifice means reaching a predetermined level from one to the other of the two positions thereof, and means for automatically returning the valving means to the one of the two stable positions thereof in response to the pressure at said control orifice returning beyond the predetermined level.

6. A fluid distributor having two stable positions, comprising:

hollow body means, said hollow body means being provided with a plurality of orifice means including first orifice means forming a supply orifice, second orifice means forming an output orifice, third orifice means forming a reference orifice and fourth orifice means forming at least one control orifice, two valve seat means within said hollow body means, one of said seat means being disposed between said first and second orifice means and the other valve seat means between the second and third orifice means, fluid tight elastic membrane means secured within said hollow body means between said third and fourth orifice means, said elastic membrane means serving to effectively isolate said fourth orifice means from said first, second and third orifice means, movable valving means within said hollow chamber means and operable to alternately close one or the other valve seat means in response to the pressure at the control orifice reaching a predetermined level, connecting means operatively connecting with each other the movable elements of said device, and means for automatically returning the valving means to its initial position upon the pressure at the control orifice returning beyond the predetermined level.

7. A fluid distributor having two stable positions, comprising:

hollow body means, said hollow body means being provided with a plurality of orifice means including first orifice means forming a supply ourifice, second orifice means forming an output orifice, third orifice means forming a reference orifice and fourth orifice means forming at least one control orifice, two valve seat means within said hollow body means, one of said seat means being disposed between said first and second orifice means and the other valve seat means between the second and third orifice means, fluid tight elastic membrane means secured within said hollow body means between said third and fourth orifice means, said elastic membrane means serving to effectively isolate said fourth orifice means from said first, second and third orifice means.

movable valving means within said hollow chamber means and operable to alternately close in the two end positions thereof one or the other valve seat means, connecting means operatively connecting with each other the movable elements of said device to actuate said valving means in response to the pressure at said control orifice reaching a predetermined level from one into the other of the end positions thereof, said valving means providing in one of the said positions thereof a communication between said first and second orifice means and in the other of the said positions a communication between said third orifice means and said second orifice means, and means for automatically returning the valving means to its initial position upon the pressure at the control orifice returning beyond the predetermined level.

8. A fluid distributor having two stable positions, comprising:

hollow body means, said hollow body means being provided with a plurality of orifice means and including, in the axial direction of said body means, first orifice means forming a supply orifice, second orifice means forming an output orifice, third orifice means forming a reference orifice and fourth orifice means forming a control orifice, two valve seat means formed within said hollow body means, one of said valve seat means being disposed between said first and second orifice means and the other between the second and third orifice means, fluid tight elastic membrane means secured within said hollow body means between said third and fourth orifice means, said elastic membrane means serving to effectively isolate said forth orifice means from said first, second and third orifice means, movable valving means within said hollow chamber means and operable to alternately close one or the other valve seat means, connecting means operatively connecting said elastic membrane means with said valving means to actuate said valving means in response to the pressure at said control orifice, said valving means providing in one of the positions thereof a communication between said first and second orifice means and in the other of the positions thereof a communication between said third orifice means and said second orifice means, and means for automatically returning the valving means to its initial position upon the pressure at the control orifice returning beyond the predetermined level.

9. A control device enabling the control of a fluid circuit when the pressure of a control circuit passes through a predetermined value, comprising:

a valve body provided with a plurality of orifices and with a plurality of fluid circuits in communication with respective orifices, fluid tight diaphragm means secured within said body in such a manner as to be exposed to the control fluid pressure of a first fluid circuit connected to the control orifice, means including said first fluid circuit for applying to said diaphragm means said control pressure, nozzle means within said body in communication with said supply orifice and forming the discharge aperture for a second fluid circuit, means including said second fluid circuit for supplying said nozzle means with a second pressure fluid including a constricted passageway, movable closure means within said valve body and operable to close said nozzle means, means operatively connecting said movable closure means with said diaphragm means for opening and closing said closure means in response to movement of said diaphragm means, spring means within said valve body and exerting a spring force on said closure means in a direction opposite to the force exerted thereon by said control pressure, a third fluid circuit, said diaphragm means serving to effectively isolate said first fluid circuit from said second and third fluid circuits, two-position valving means operable either fully or not at all to valve said third fluid circuit, said second circuit being operable to cause flip-flop of said valving means, a chamber with an outlet to the atmosphere being provided within said body into which discharges said nozzle means, and said constricted passageway having a fluid resistance which permits a flow therethrough about equivalent to the flow through the fully opened nozzle means.

10. A control device enabling the control of a fluid circuit when the pressure of a control circuit passes through a predetermined value, comprising:

a valve body provided with a plurality of orifices and with a plurality of fluid circuits in communication with respective orfices, fluid tight diaphragm means secured within said body in such a manner as to be exposed to the control fluid pressure of a first fluid circuit connected to a control orifice, means including said first fluid circuit for applying to said diaphragm means said control pressure, nozzle means within said body in communication with a supply orifice and forming the discharge aperture for a second fluid circuit, means including said second fluid circuit for supplying said nozzle means with a second pressure fluid including a constricted passageway, movable closure means within said valve body and operable to close said nozzle means, means operatively connecting said movable closure means with said diaphragm means for opening and closing said closure means in response to movement of said diaphragm means, spring means within said valve body and exerting a spring force on said closure means in a direction opposite to the force exerted thereon by said control pressure, said spring means being adjustable to enable adjustment of the value of the control pressure at which said movable closure means is displaced, a third fluid circuit, said diaphragm means serving to effectively isolate said first fluid circuit from said second and third fluid circuits, two-position valving means operable either fully or not at all to valve said third fluid circuit, said second circuit being operable to cause flip-flop of said valving means, a chamber with an outlet to the atmosphere being provided within said body into which discharges said nozzle means, said constricted passageway having a fluid resistance which permits a flow therethrough about equivalent to the flow through the fully opened nozzle means.

11. A control device enabling the control of a fluid circuit when the pressure of a control circuit passes through a predetermined value, comprising:

a valve body provided with a plurality of orifices including an output orifice and with a plurality of fluid circuits in communication with respective orifices, a first chamber formed within said valve body, fluid tight diaphrgam means secured within said body and subdividing said first chamber into two chamber portions, means including a first fluid circuit for supplying a control fluid pressure to one of said chamber portions to subject said diaphragm means to the control pressure, nozzle means within said body and discharging into the other chamber portion, means including a second fluid circuit for supplying a second fluid to said nozzle means by way of a constricted passageway terminating in another chamber with which said nozzle means is in communication, a closure member operable to close said nozzle means, means operatively connecting said closure member with said diaphragm means so as to close said nozzle member in the presence of a predetermined control pressure within said first fluid circuit, a spring in said one chamber operatively connected at one end thereof with said diaphragm means and at the other end thereof with a relative fixed spring abutment, means including a third fluid circuit for supplying a fluid pressure to the output orifice, said diaphragm means serving to effectively isolate said first fluid circuit from said second and third fluid circuits, bi-stable valving means in said third fluid circuit and having two end positions for varying the fluid pressure in said output orifice by interrupting said third fluid circuit, said second fluid circuit being operable to cause switching of said bi-stable valving means by the pressure build-up in said second chamber upon closure of said nozzle means.

12. A control device enabling the control of a fluid circuit when the pressure of a control circuit passes through a predetermined value, comprising:

a valve body provided with a plurality of orifices including an output orifice and with a plurality of fluid circuits in communication with respective orifices, a first chamber formed within said valve body, fluid tight diaphragm means secured within said body and subdividing said first chamber into two chamber portions, means including a first fluid circuit for supplying a control fluid pressure to one of said chamber portions to subject said diaphragm means to the control pressure, nozzle means within said body and discharging into the other chamber portion, means including a second fluid circuit for supplying a second fluid to said nozzle means by way of a constricted passageway terminating in another chamber with which said nozzle means is in communication, a closure member operable to close said nozzle means, means operatively connecting said closure member with said diaphragm means so as to close said nozzle member in the presence of a predetermined control pressure within said first fluid circuit, a tension spring in said one chamber operatively connected at one end thereof with said diaphragm means and at the other end thereof with a relative fixed spring abutment, said spring abutment being adjustable to enable adjustment of the value of the control pressure at which switching takes place, means including a third fluid circuit for supplying a fluid pressure to the output orifice, and bi-stable valving means in said third fluid circuit and having two end positions for varying the fluid pressure in said output orifice by interrupting said third fluid circuit, said second fluid circuit being operable to cause switching of said bi-stable valving means by the pressure build-up in said second chamber upon closure of said nozzle means.

13. A control device enabling the control of a fluid circuit when the pressure of a control circuit passes through a predetermined value, comprising:

a valve body provided with a plurality of orifices including an output orifice and with a plurality of fluid circuits in communication with respective orifices, a first chamber formed within said valve body, fluid tight diaphragm means secured within said body and subdividing said first chamber into two chamber portions, means including a first fluid circuit for supplying a control fluid pressure to one of said chamber portions to subject said diaphragm means to the control pressure, nozzle means within said body and discharging into the other chamber portions, means including a second fluid circuit for supplying a second fluid to said nozzle means by way of a first constricted passageway terminating in a second chamber with which said nozzle means is in communication, said second chamber being vented to atmosphere through a second constricted passageway, a closure member operable to close said nozzle means, means operatively connecting said closure member with said diaphragm means so as to close said nozzle member in the presence of a predetermined control pressure within said first fluid circuit, a spring in said one chamber operatively connected at one end thereof with said diaphragm means and at the other end thereof with a relative fixed spring abutment, means including a third fluid circuit for supplying a fluid pressure to the output orifice, said diaphragm means serving to effectively isolate said first fluid circuit from said second and third fluid circuits, bi-stable valving means in said third fluid circuit and having two end positions for varying the fluid pressure in said output orifice by interrupting said third fluid circuit.

said second fluid circuit being operable to cause switching of said bi-stable valving means by the pressure build-up in said second chamber upon closure of said nozzle means, said first and second constricted passageway for supplying and venting said second chamber with fluid from said second fluid circuit having a fluid resistance of about the same order of magnitude as that of the fully opened nozzle means.

14. A control device enabling the control of a fluid circuit when the pressure of a control circuit passes through a predetermined value, comprising:

a valve body provided with a plurality of orifices including an output orifice and with a plurality of fluid circuits in communication with respective orifices, a first chamber formed within said valve body, fluid tight diaphragm means secured within said body and subdividing said first chamber into two chamber portions, means including a first fluid circuit for supplying a control fluid pressure to one of said chamber portions to subject said diaphragm means to the control pressure, nozzle means within said body and discharging into the other chamber portion, means including a second fluid circuit for supplying a second fluid to said nozzle means by way of a first constricted passageway terminating in a second chamber with which said nozzle means is in communication, said second chamber being vented to atmosphere through a second constricted passageway, a closure member operable to close said nozzle means, means operatively connecting said closure member with said diaphragm means so as to close said nozzle member in the presence of a predetermined control pressure within said first fluid circuit, a spring in said one chamber operatively connected at one end thereof with said diaphragm means and at the other end thereof with a relative fixed spring abutment, means including a third fluid circuit for supplying a fluid pressure to the output orifice, said diaphragm means serving to effectively isolate said first fluid circuit from said second and third fluid circuits, bi-stable valving means in said third fluid circuit and having two end position for varying the fluid pressure in said output orifice by interrupting said third fluid circuit, said bi-stable valving means including further diaphragm means sealing the bottom of said second chamber and at least one ball-type valve member, said second fluid ciruit being operable to cause switching of said bi-stable valving means through movement of said ball member by the pressure build-up on the further diaphragm means in said second chamber upon closure of said nozzle means, said first and second constricted passageway for supplying and venting said second chamber with fluid from said second fluid circuit having a fluid resistance of about the same order of magnitude as that of the fully opened nozzle means.

15. A control device enabling the control of a fluid circuit when the pressure of a control circuit passes through a predetermined value, comprising:

a valve body provided with a plurality of orifices including an output orifice and with a plurality of fluid circuits in communication with respective orifices, a first chamber formed within said valve body, fluid tight diaphragm means secured within said body and subdividing said first chamber into two chamber portions, means including a first fluid circuit for supplying a control fluid pressure to one of said chamber portions to subject said diaphragm means to the control pressure, nozzle means within said body and discharging into the other chamber portion, means including a second fluid circuit for supplying a second fluid to said nozzle means by way of a constricted passageway terminating in another chamber with which said nozzle means is in communication, a closure member operable to close said nozzle means, means operatively connecting said closure member with said diaphragm means so as to close said nozzle member in the presence of a predetermined control pressure within said first fluid circuit, a tension spring in said one chamber operatively connected at one end thereof with said diaphragm means and at the other end thereof with a relative fixed spring abutment, said spring abutment being adjustable to enable adjustment of the value of the control pressure at which switching takes place, means including a third fluid circuit for supplying a fluid pressure to the output orifice from said second fluid circuit, and bi-stable valving means in said third fluid circuit and having two end positions for varying the fluid pressure in said output orifice by interrupting said third fluid circuit, said bi-stable valving means including further diaphragm means sealing the bottom of said second chamber and at least one ball-type valve member, said second fluid circuit being operable to cause switching of said bi-stable valving means by the pressure build-up in said second chamber upon closure of said nozzle means, said constricted passageway for supplying said second chamber with fluid from said second fluid circuit having a fluid resistance of about the same order of magnitude as that of the fully opened nozzle means.

16. A control device enabling the control of a fluid circuit when the pressure of a control circuit passes through a predetermined value, comprising:

a valve body provided with a plurality of orifices including a supply orifice, an output orifice, a reference orifice and a control orifice, said valve body being further provided with a plurality of fluid circuits in communication with respective orifices, a first chamber formed within said valve body, a slidable piston structure within said first chamber and subdividing the same into two chamber portions, means including a first fluid circuit for supplying by way of said control orifice a control fluid pressure to one of the two chamber portions of said first chamber to thereby actuate said piston structure in one direction by said control fluid pressure, a second chamber formed within said valve body, fluid tight diaphragm means secured within said body and subdividing said second chamber into two chamber portions, nozzle means within said body and discharging into the remaining portion of said first chamber, a closure member for closing said nozzle means, means operatively connecting said closure member with said piston structure, a spring within said valve body and exerting a spring force on said piston structure in the direction opposite to the control fluid pressure, means including a second fluid circuit for supplying supply fluid pressure to said nozzle means by way of said supply orifice, a restricted passageway and one chamber portion of said second chamber, means including a third fluid circuit for supplying a reference fluid pressure to the other side of said second chamber by way of said reference orifice, means including a fourth fluid circuit provided with valve seat means for supplying either a predetermined fluid pressure or said reference pressure to said output orifice, said diaphragm means serving to effectively isolate said first fluid circuit from said second, third and fourth fluid circuits, bi-stable valving means in said third and fourth fluid circuits and having two end positions for producing in said output orifice either said predetermined or said reference pressure, said second fluid circuit being operable to cause switching of said bi-stable valving means by the pressure build-up in the other chamber portion of said second chamber upon closure of said nozzle means.

17. A control device enabling the control of a fluid circuit when the pressure of a control circuit passes through a predetermined value, comprising:

a valve body provided with a plurality of orifices including a supply orifice, an output orifice, a reference orifice and a control orifice, said valve body being further provided with a plurality of fluid circuits in communication with respective orifices, a first chamber formed within said valve body, a slidable piston structure within said first chamber and subdividing the same into two chamber portions, means including a first fluid circuit for supplying by way of said control orifice a control fluid pressure to one of the two chamber portions of said first chamber to thereby actuate said piston structure in one direction by said control fluid pressure, a second chamber formed within said valve body, fluid tight diaphragm means secured within said body and subdividing said second chamber into two chamber portiions, nozzle means within said body and discharging into the remaining chamber portion of said first chamber, a closure member for closing said nozzle means, means operatively connecting said closure member with said piston structure, a spring within said valve body and exerting a spring force on said piston structure in the direction opposite to the control fluid pressure, means including a second fluid circuit for supplying supply fluid pressure to said nozzle means by way of said supply orifice, a restricted passageway and one chamber portion of said second chamber, means including a third fluid circuit for supplying a reference fluid pressure to the other side of said second chamber by way of said reference orifice, means including a fourth fluid circuit provided with valve seat means for supplying either a predetermined fluid pressure or said reference pressure to said output orifice, said diaphragm means serving to effectively isolate said first fluid circuit from said second, third and fourth fluid circuits, bi-stable valving means in said third and fourth fluid circuits and having two end positions for producing in said output orifice either said predetermined or said reference pressure, said second fluid circuit being operable to cause switching of said bi-stable valving means by the pressure build-up in the other chamber portion of said second chamber upon closure of said nozzle means, said restricted passage for supplying said second chamber with fluid from said second fluid circuit having a fluid resistance of about the same order of magnitude as that of the fully opened nozzle means.

18. A control device enabling the control of a fluid circuit when the pressure of a control circuit passes through a predetermined value, comprising:

a valve body provided with a plurality of orifices including a supply orifice, an output orifice, a reference orifice and a control orifice, said valve body being further provided with a plurality of fluid circuits in communication with respective orifices, a first chamber formed within said valve body, a slidable piston structure within said first chamber and subdividing the same into two chamber portions, means including a first fluid circuit for supplying by way of said control orifice a control fluid pressure to one of the two chamber portions of said first chamber to thereby actuate said piston structure in one direction by said control fluid pressure, a second chamber formed within said valve body, fluid tight diaphragm means secured within said body and subdividing said second chamber into two chamber portions, nozzle means within said body and discharging into the remaining chamber portion of said first chamber, a closure member for closing said nozzle means, means operatively connecting said closure member with said piston structure, a spring within said valve body and exerting a spring force on said piston structure in the direction opposite to the control fluid pressure, means including a second fluid circuit for supplying supply fluid pressure to said nozzle means by way of said supply orifice, a restricted passageway and one chamber portion of said second chamber, means including a third fluid circuit for supplying a reference fluid pressure to the other side of said second chamber by way of said reference orifice, means including a fourth fluid circuit provided with valve seat means for supplying either a predetermined fluid pressure or said reference pressure to said output orifice, said diaphragm means serving to effectively isolate said first fluid circuit from said second, third and fourth fluid circuits, bi-stable valving means in said third and fourth fluid circuits and having two end positions for producing in said output orifice either said predetermined or said reference pressure, said bi-stable valving means including one ball-type valve member, plunger means operatively connecting said ball-type valve member with said diaphragm means, and means for supplying a fluid pressure to said ball-type valve member for actuating the latter in a direction opposite to the actuation thereof by said plunger means, said second fluid circuit being operable to cause switching of said bi-stable valving means by the pressure build-up in the other chamber portion of said second chamber upon closure of said nozzle means.

19. A control device enabling the control of a fluid circuit when the pressure of a control circuit passes through a predetermined value, comprising:

a valve body provided with a plurality of orifices including a supply orifice, an output orifice, a reference orifice and a control orifice, said valve body being further provided with a plurality of fluid circuits in communication with respective orifices, a first chamber formed within said valve body, a slidable piston structure within said first chamber and subdividing the same into two chamber portions, means including a first fluid circuit for supplying by way of said control orifice a control fluid pressure to one of the two chamber portions of said first chamber to thereby actuate said piston structure in one direction by said control fluid pressure, a second chamber formed within said valve body, fluid tight diaphragm means secured within said body and subdividing said second chamber into two chamber portions, nozzle means within said body and discharging into the remaining chamber portion of said first chamber, a closure member for closing said nozzle means, means operatively connecting said closure member with said piston structure, a spring within said valve body and exerting a spring force on said piston structure in the direction opposite to the control fluid pressure, means including a second fluid circuit for supplying supply fluid pressure to said nozzle means by way of said supply orifice, a restricted passageway and one chamber portion of said second chamber, means including a third fluid circuit for supplying a reference fluid pressure to the other side of said second chamber by way of said reference orifice, means including a fourth fluid circuit provided with valve seat means for supplying either a predetermined fluid pressure or said reference pressure to said output orifice, said diaphragm means serving to effectively isolate said first fluid circuit from said second, third and fourth fluid circuits, bi-stable valving means in said third and fourth fluid circuits and having two end positions for producing in said output orifice either said predetermined or said reference pressure, said bi-stable valving means including one ball-type valve member, plunger means operatively connecting said ball-type valve member with said diaphragm means, and means for supplying a fluid pressure to said ball-type valve member for actuating the latter in a direction opposite to the actuation thereof by said plunger means, said second fluid circuit being operable to cause switching of said bi-stable valving means by the pressure build-up in the other chamber portion of said second chamber upon closure of said nozzle means, said restricted passage for supplying said second chamber with fluid from said second fluid circuit having a fluid resistance of about the same order of magnitude as that of the fully opened nozzle means.

20. A control device enabling the control of a fluid circuit when the pressure of a control circuit passes through a predetermined value, comprising:

a valve body provided with a plurality of orifices and including at least one supply orifice, an output orifice, a reference orifice and a control orifice, said valve body being further provided with a plurality of fluid circuits in communication with respective orifices, a chamber formed within said body, fluid tight diaphragm means secured within said body and subdividing said chamber into two portions, pivotal lever means in said control device, means including a first fluid circuit for actuating said lever means at a first point intermediate its ends by the control fluid pressure supplied by way of said control orifice, nozzle means within said valve body and forming the discharge orifice for one of said chamber portions, means including a second fluid circuit for supplying supply fluid pressure to said nozzle means by way of said supply orifice, a constricted passageway and said one chamber portion, a closure member for closing said nozzle means operatively connected with said lever means, spring means within said control device and exerting a spring force on said lever means at a second point thereof and in opposition to the control fluid pressure, means including a third fluid circuit for supplying reference fluid pressure to the other chamber portion by way of said reference orifice, means including a fourth fluid circuit for supplying supply fluid pressure to said outlet orifice from said supply orifice, said diaphragm means serving to effectively isolate said first fluid circuit from said second, third and fourth fluid circuits, two valve seat means disposed in said third and fourth fluid circuit between said reference orifice and said outlet orifice and between said outlet orifice and said supply orifice, and bi-stable valving means operable to alternately abut against said valve seat means to produce one of two pressure values in said output orifice, said second fluid circuit being operable to cause switching of said valving means by the pressure build-up in said one chamber portion upon closure of said nozzle means.

21. A control device enabling the control of a fluid circuit when the pressure of a control circuit passes through a predetermined value, comprising:

a valve body provided with a plurality of orifices and including at least one supply orifice, an output orifice, a reference orifice and a control orifice, said valve body being further provided with a plurality of fluid circuits in communication with respective orifices, a chamber formed within said body, fluid tight diaphragm means secured within said body and subdividing said chamber into two portions, pivotal lever means in said control device, means including a first fluid circuit for actuating said lever means at a first point intermediate its ends by the control fluid pressure supplied by way of said control orifice, nozzle means within said valve body and forming the discharge orifice for one of said chamber portions, means including a second fluid circuit for supplying supply fluid pressure to said nozzle means by way of said supply orifice, a constricted passageway and said one chamber portion, a closure member for closing said nozzle means operatively connected with said lever means, spring means within said control device and exerting a spring force on said lever means at a second point thereof and in opposition to the control fluid pressure, means including a third fluid circuit for supplying reference fluid pressure to the other chamber portion by way of said reference orifice, means including a fourth fluid circuit for supplying supply fluid pressure to said outlet orifice from said outlet orifice from said supply orifice, said diaphragm means serving to effectively isolate said first fluid circuit from said second, third and fourth fluid circuits, two valve seat means disposed in said third and fourth fluid circuit between said reference orifice and said outlet orifice and between said outlet orifice and said supply orifice, and bi-stable valving means operable to alternately abut against said valve seat means to produce one of two pressure values in said output orifice, said second fluid circuit being operable to cause switching of said valving means by the pressure build-up in said one chamber portion upon closure of said nozzle means, said constricted passage having a fluid resistance of about the same order of magnitude as that of the fully opened nozzle means.

22. A control device enabling the control of a fluid circuit when the pressure of a control circuit passes through a predetermined value, comprising:

a valve body provided with a plurlity of orifices and including at least one supply orifice, an output orifice, a reference orifice and a control orifice, said valve body being further provided with a plurality of fluid circuits in communication with respective orifices, a chamber formed within said body, fluid tight diaphragm means secured within said body and subdividing said chamber into two portions, pivotal lever means in said control device, means including a first fluid circuit for actuating said lever means at a first point intermediate its ends by the control fluid pressure supplied by way of said control orifice, nozzle means within said valve body and forming the discharge orifice for one of said chamber portions, means including a second fluid circuit for supplying supply fluid pressure to said nozzle means by way of said supply orifice, a constricted passageway and said one chamber portion, a closure member for closing said nozzle means operatively connected with said lever means, spring means within said control device and exerting a spring force on said lever means at a second point thereof and in opposition to the control fluid pressure, means including a third fluid circuit for supplying reference fluid pressure to the other chamber portion by way of said reference orifice, means including a fourth fluid circuit for supplying supply fluid pressure to said outlet orifice from said supply orifice, said diaphragm means serving to effectively isolate said first fluid circuit from said second, third and fourth fluid circuits, two valve seat means disposed in said third and fourth fluid circuit between said reference orifice and said outlet orifice and between said outlet orifice and said supply orifice, and bi-stable valving means operable to alternately abut against said valve seat means to produce one of two pressure values in said output orifice, said bi-stable valving means including a ball-type valve member and plunger means operatively connecting said diaphragm means with said valve member, said second fluid circuit being operable to cause switching of said valve means by the pressure build-up in said one chamber portion upon closure of said nozzle means.

23. A control device enabling the control of fluid circuit when the pressure of a control circuit passes through a predetermined value, comprising:

a valve body provided with a plurality of orifices and including at least one supply orifice, an output orifice, a reference orifice and a control orifice, said valve body being further provided with a plurality of fluid circuits in communiction with respective orifices, a chamber formed within said body, fluid tight diaphragm means secured within said body and subdividing said chamber into two portions, pivotal lever means in said control device, means including a first fluid circuit for actuating said lever means at a first point intermediate its ends by the control fluid pressure supplied by way of said control orifice, nozzle means within said valve body and forming the discharge orifice for one of said chamber portions, means including a second fluid circuit for supplying supply fluid pressure to said nozzle means by way of said supply orifice, a constricted passageway and said one chamber portion, a closure member for closing said nozzle means operatively connected with said lever means, spring means within said control device and exerting a spring force on said lever means at a second point thereof and in opposition to the control fluid pressure, said spring means being adjustable to enable adjustment of the value of the control pressure at which switching takes place, means including a third fluid circuit for supplying reference fluid pressure to the other chamber portion by way of said reference orifice, means including a fourth fluid circuit for supplying supply fluid pressure to said outlet orifice from said supply orifice, said diaphragm means serving to effectively isolate said first fluid circuit from said second, third and fourth fluid circuits, two valve seat means disposed in said third and fourth fluid circuit between said reference orifice and said outlet orifice and between said outlet orifice and said supply orifice, and bi-stable valving means operable to alternately abut against said valve seat means to produce one of two pressure values in said output orifice, said bi-stable valving means including a ball-type valve member and plunger means operatively connecting said diaphragm means with said valve member, said second fluid circuit being operable to cause switching of said valving means by the pressure build-up in said one chamber portion upon closure of said nozzle means, said constricted passage having a fluid resistance of about the same order of magnitude as that of the fully opened nozzle means.

24. A fluid distributor for use in logical circuits and having two stable positions, comprising:

hollow body means provided with a plurality of passageways and with a plurality of orifices in communication with said passageways and including at least a first orifice for connection with a supply pressure fluid, a second orifice forming the distributor output, a third orifice for connection with a reference pressure fluid and at least one fourth orifice for connection with a control pressure fluid, some of said passageways providing a first communication between said first orifice and said second orifice, a second communication between said second orifice and said third orifice and a third communication between said fourth orifice and one of the other orifices, two valve seat means within said hollow body means, one of said valve seat means being disposed in said first communication between said first and second orifices and the other valve seat means being disposed in the second communication between the second and third orifices, movable valving means operable to engage alternately with one or the other valve seat means, fluid tight elastic membrane means within said hollow body means in said third communication between said fourth orifice and the said one other orifice, means for securing said membrane means within said body means in such a manner as to provide a fluid-tight seal in said third communication, said elastic membrane means serving to isolate said fourth orifice from said first, second and third orifices, and connecting means operatively connecting said elastic membrane means with said valving means to actuate said valving means in response to the pressure at said control orifice from one of the end positions to the other of said end positions thereof whereby said valving means provides in one of the end positions thereof a communication between the first and second orifices and in the other of the end positions thereof a communication between said third and second orifices.

25. A fluid distributor for use in logical circuits and having two stable positions, comprising:

hollow body means composed of a plurality of housing elements and provided with a plurality of passageways and with a plurality of orifices in communication with said passageways and including at least a first orifice for connection with a supply pressure fluid, a second orifice forming the distributor output, a third orifice for connection with a reference pressure fluid and at least one fourth orifice for connection with a control pressure fluid, some of said passageways providing a first communication between said first orifice and said second orifice, a second communication between said second orifice and said third orifice and a third communication between said fourth orifice and one of the other orifices, two valve seat means within said hollow body means, one of said valve seat means being disposed in said first communication between said first and second orifices and the other valve seat means being disposed in the second communication between the second and third orifices, movable valving means operable to engage alternately with one or the other valve seat means, fluid tight elastic membrane means within said hollow body means in said third communication between said fourth orifice and the said one other orifice, means for securing said membrane means within said body means intermediate two of said housing elements in such a manner as to provide a fluid-tight seal in said third communication including means to prevent crushing of said diaphragm means, said elastic membrane means serving to isolate said fourth orifice from said first, second and third orifices, and connecting means operatively connecting said elastic membrane means with said valving means to actuate said valving means in response to the pressure at said control orifice from one of the end positions to the other of said end positions thereof whereby said valving means provides in one of the end positions thereof a communication between the first and second orifices and in the other of the end positions thereof a communication between said third and second orifices.

26. A logical circuit including a fluid distributor having two stable positions, comprising:

hollow body means provided with a plurality of passageways and with a plurality of orifices in communication with said passageways and including at least a first orifice for connection with a supply pressure fluid, a second orifice forming the distributor output, a third orifice for connection with a reference pressure fluid and at least one-fourth orifice for connection with a control pressure fluid, said passageways providing at least a first communication between said first orifice and said second orifice, a second communication between said second orifice and said third orifice and a third communication between said fourth orifice and one of the other orifices, two valve seat means within said hollow body means, one of said valve seat means being disposed in said first communication between said first and second orifices and the other valve seat means being disposed in the second communication between the second and third orifices, movable valve means operable to engage alternately with one or the other valve seat means, fluid tight elastic membrane means secured within said hollow body means in said third communication between said fourth orifice and the said one other orifice and providing a fluid-tight seal therebetween, said elastic membrane means serving to isolate said fourth orifice from said first, second and third orifices, means for feeding supply pressure fluid to said first orifice, said second orifice being at a reference pressure, and means for supplying a control pressure fluid to said fourth orifice, connecting means operatively connecting said elastic membrane means with said valving means to actuate said valving means in response to the pressure at said control orifice from one of the end positions of the other of said end positions thereof whereby said valving means provides in one of the end positions thereof a communication between the first and second orifices and in the other of the end positions thereof a communication between said third and second orifices, so that the pressure at the output is either said supply pressure or said reference pressure.

27. A logical "NOR" circuit including a fluid distributor having two stable positions, comprising:

hollow body means being provided with a plurality of passageways and with a plurality of orifices in communication with said pasageways and including at least a first orifice for connection with a supply pressure fluid, a second orifice forming the distributor output, a third orifice for connection with a reference pressure fluid and a plurality of control orifices for connection with control pressure fluids, some of said passageways providing a first communication between said first orifice and said second orifice, a second communication between said second orifice and said third orifice and a third communication between said third orifice and said control orifices, two valve seat means within said hollow body means, one of said valve seat means being disposed in said first communication between said first and second orifices and the other valve seat means being disposed in the second communication between the second and third orifices, movable valving means operable to engage alternately with one or the other valve seat means, fluid tight elastic membrane means secured within said hollow body means in said third communication between said third orifice and said control orifices and providing a fluid-tight seal therebetween, said elastic membrane means serving to isolate said control orifices from said first, second and third orifices, means for feeding supply pressure fluid to said first orifice, said second orifice being at a reference pressure, and means for supplying control pressure fluids to said control orifices, and connecting means operatively connecting said elastic membrane means with said valving means to actuate said valving means in response to the pressure at any one of said control orifices from one of the end positions to the other of said end positions thereof whereby said valving means provides in said one of the end positions thereof a communication between the first and second orifices and in the said other end position thereof a communication between said third and second orifices, so that the pressure at the output is either said supply pressure in the absence of a signal at all control orifices or said reference pressure in the presence of a signal at any one of said control orifices.

28. A logical "NOR" circuit including a fluid distributor having two stable positions, comprising:

hollow body means being provided with a plurality of passageways and with a plurality of orifices in communication with said passageways and including at least a first orifice for connection with a supply pressure fluid, a second orifice forming the distributor output, a third orifice for connection with a reference pressure fluid and a plurality of control orifices for connection with control pressure fluids, some of said passageways providing a first communication between said first orifice and said second orifice, a second communication between said second orifice and said third orifice and a third communication between said control orifices and said third orifice, two valve seat means within said hollow body means, one of said valve seat means being disposed in said first communication between said first and second orifices and the other valve seat means being disposed in the second communication between the second and third orifices, movable valving means operable to engage alternately with one or other valve seat means, fluid tight elastic membrane means secured within said hollow body means in said third communication between said third orifice and the next adjacent said control orifice and between any two consecutive control orifices to provide a fluid-tight seal, said elastic membrane means serving to isolate said control orifices from each other and from said first, second and third orifices, means for feeding supply pressure fluid to said first orifice, said second orifice being at a reference pressure, and means for supplying control pressure fluids to said control orifices, and connecting means operatively connecting each of said elastic membrane means with said valving means to actuate said valving means in response to the pressure at any one of said control orifices from one of the end positions to the other of said end positions thereof whereby said valving means provides in said one of the end positions thereof a communication between the first and second orifices and in the said other end position thereof a communication between the first and second orifices and in the said other end position thereof a communication between said third and second orifices so that the pressure at the output is either said supply pressure in the absence of a signal at all control orifices or said reference pressure in the presence of a signal at any one of said control orifices.

29. A logical "NOR" circuit including a fluid distributor having two stable positions comprising:

hollow body means being provided with a plurality of passageways and with a plurality of orifices in communication with said passageways and including at least a first orifice for connection with a supply pressure fluid, a second orifice forming the distributor output, a third orifice for connection with a reference pressure fluid and a plurality of control orifices for connection with control pressure fluids, some of said passageways providing a first communication between said first orifice and said second orifice, a second communication between said first orifice and said second orifice, a second communication between said second orifice and said third orifice and a third communication between said third orifice and said control orifices including parallel branch communications to each control orifice, two valve seat means within said hollow body means, one of said valve seat means being disposed in said first communication between said first and second orifices and the other valve seat means being disposed in the second communication between the second and third orifices, movable valving means operable to engage alternately with one or the other valve seat means, fluid tight elastic membrane means secured within said hollow body means in said third communication between said third orifice and the branch communications leading to said control orifices and providing a fluid-tight seal therebetween, said elastic membrane means serving to isolate said control orifices from said first, second and third orifices, check valve means for each branch communication to render the same independent of one another, means for feeding supply pressure fluid to said first orifice, said second orifice being at a reference pressure, and means for supplying control pressure fluids to said control orifices, and connecting means operatively connecting said elastic membrane means with said valving means to actuate said valving means in response to the pressure at any one of said control orifices from one of the end positions to the other of said end positions thereof whereby said valving means provides in said one of the end positions thereof a communication between the first and second orifices and in the said other end position thereof a communication between said third and second orifices, so that the pressure at the output is either said supply pressure in the absence of a signal at all control orifices or said reference pressure in the presence of a signal at any one of said control orifices.

30. A logical "OR" circuit including a fluid distributor having two stable positions, comprising:

hollow body means being provided with a plurality of passageways and with a plurality of orifices in communication with said passageways and including at least a first orifice for connection with a supply pressure fluid, a second orifice forming the distributor output, a third orifice for connection with a reference pressure fluid and a plurality of control orifices for connection with control pressure fluids, some of said passageways providing a first communication between said first orifice and said second orifice, a second communication between said second orifice and said third orifice and a third communication between said third orifice and said control orifices, two valve seat means within said hollow body means, one of said valve seat means being disposed in said first communication between said first and second orifices and the other valve seat means being disposed in the second communication between the second and third orifices, movable valving means operable to engage alternately with one or the other valve seat means, fluid tight elastic membrane means secured within said hollow body means in said third communication between said third orifice and each of said control orifices and providing a fluid-tight seal therebetween, said elastic membrane means serving to isolate said control orifices from each other and from said first, second and third orifices, means for feeding supply pressure fluid to said first orifice, said second orifice being at a reference pressure, and means for supplying control pressure fluids to said control orifices, connecting means operatively connecting said elastic membrane means with said valving means to actuate said valving means in response to the pressure at said control orifice from one of the end positions to the other of said end positions thereof whereby said valving means provides in said one end position a communication between the third and second orifices and in the said other end position a communication between said first and second orifices, so that the pressure at the output is either said supply pressure in the presence of a signal at any one of said control orifices or said reference pressure in the absence of a signal at all control orifices.

31. A logical circuit including a double fluid distributor structure having two stable positions for each distributor section, comprising:

hollow body means being provided with a plurality of passageways and with a plurality of orifices in communication with said pasageways and including a first common orifice for connection with a supply pressure fluid as well as in each distributor section a second orifice forming the distributor output of the respective section thereof, a third orifice for connection with a reference pressure fluid and at least one control orifice for connection with a control pressure fluid, some of said passageways providing a first communication between said first orifice and each of said second orifice, a second communication in each distributor section between a respective second orifice and said third orifice and a third communication in each distributor section between said third orifice and the respective control orifice, two pair of valve seat means within said hollow body means, two of said valve seat means being disposed in said first communication between said first orifice and a respective second orifice in each section and the other valve seat means being disposed in each of the second communications between respective second and third orifices, movable valving means operable to engage alternately with the one or the other of a pair of valve seat means, fluid tight elastic membrane means secured within said hollow body means in each of said third communication between a respective third orifice and control orifice and providing a fluid-tight seal therebetween, said elastic membrane means serving to isolate said control orifices from said first, second and third orifices, means for feeding supply pressure fluid to said first orifice, each of said second orifices being at a reference pressure, and means for supplying control pressure fluid to said control orifices, and connecting means operatively and mechanically connecting said elastic membrane means with respective valving means to actuate the valving means in response to the pressure at the corresponding control orifice from one of the end positions to the other of said end positions thereof whereby the valving of said valving means provides in one of the end positions thereof a communication between respective first and second orifices and in the other of the end positions thereof a communication between respective third and second orifices so that the pressure at the corresponding output is either said supply pressure or said reference pressure.

32. A logical circuit including a fluid distributor having two stable positions, comprising:

hollow body means being provided with a plurality of passageways and with a plurality of orifices in communication with said passageways and including a first orifice for connection with a supply pressure fluid, a second orifice forming the distributor output, a third orifice for connection with a reference pressure fluid and a plurality of control orifices for connection with control pressure fluids, some of said passageways providing a first communication between said first orifice and said second orifice, a second communication between said second orifice and said third orifice, a third communication between said third orifice and the control orifices following said third orifice, and a fourth communication between said first orifice and the control orifices following said one orifice, two valve seat means within said hollow body means, one of said valve seat means being disposed in said first communication between said first and second orifices and the other valve seat means being disposed in the second communication between the second and third orifices, movable valving means operable to engage alternately with one or the other valve seat means, a plurality of fluid tight elastic membrane means secured within said hollow body means in said third communication between said third orifice and next adjacent control orifice as well as between any consecutive control orifices following said third orifice and in said fourth communication between said first orifice and the next adjacent control orifice as well as between any consecutive control orifices following said one orifice, each membrane means providing a fluid-tight seal in the respective passageway and serving to isolate said control orifices from each other and from said first, second and third orifices, means for feeding supply pressure fluid to said first orifice, said second orifice being at a reference pressure, and means for supplying control pressure fluid to said control orifices, and connecting means operatively connecting said elastic membrane means with said valving means to actuate said valving means in response to the pressure at said control orifices from one of the end positions to the other of said end positions thereof.

33. A logical circuit including a fluid distributor having two stable positions, comprising:

hollow body means being provided with a plurality of passageways and with a plurality of orifices in communication with said passageways and including a first orifice for connection with a supply pressure fluid, a second orifice forming the distributor output, a third orifice for connection with a reference pressure fluid and a plurality of control orifices for connection with control pressure fluids, some of said passageways providing a first communication between said first orifice and said second orifice, a second communication between said second orifice and said third orifice, a third communication between said third orifice and the control orifices following said third orifice, and a fourth communication between said first orifice and the control orifices following said one orifice, two valve seat means within said hollow body means, one of said valve seat means being disposed in said first communication between said first and second orifices and the other valve seat means being disposed in the second communication between the second and third orifices, movable valving means operable to engage alternately with one or the other valve seat means, a plurality of fluid tight elastic membrane means secured within said hollow body means in said third communication between said third orifice and next adjacent control orifice as well as between any consecutive control orifices following said third orifice and in said fourth communication between said first orifice and the next adjacent control orifice as well as between any consecutive control orifices following said one orifice, each membrane means providing a fluid-tight seal in the respective passageway, and serving to isolate said control orifices from each other and from said first, second and third orifices, means for feeding supply pressure fluid to said first orifice, said second orifice being at a reference pressure, and means for supplying control pressure fluid to said control orifices, and connecting means operatively connecting said elastic membrane means with said valving means to actuate said valving means in response to the pressure at said control orifices from one of the end positions to the other of said end positions thereof, the control orifices on one side predominating in the control effect over the control orifices on the other.

References Cited

UNITED STATES PATENTS

| | | | |
|---|---|---|---|
| 2,602,467 | 7/1952 | Griswold | 251—61 |
| 2,736,337 | 2/1956 | Parks et al. | 137—82 X |
| 2,811,170 | 10/1957 | Schmidt | 137—625.64 |
| 2,858,840 | 11/1958 | Wright | 137—82 |
| 2,887,125 | 5/1959 | Lucien | 137—625.27 X |
| 2,985,141 | 5/1961 | Gustafson | 251—29 X |
| 2,991,805 | 7/1961 | Page | 137—625.67 |
| 3,047,017 | 7/1962 | Brinkel | 137—625.6 |
| 3,057,551 | 10/1962 | Etter | 137—625.48 X |
| 3,070,295 | 12/1962 | Glatti | 137—112 X |
| 3,105,508 | 10/1963 | Bowditch et al. | 137—82 |

FOREIGN PATENTS 1,329,720  5/1963  France.

HENRY T. KLINKSIEK, Examiner.

M. CARY NELSON, Primary Examiner.